June 7, 1938.  C. B. DE VLIEG  2,119,705

BACKLASH ELIMINATOR MECHANISM

Filed Jan. 7, 1937  2 Sheets-Sheet 1

Witness
Charles T. Olson

Inventor
Charles B. De Vlieg
by Fish Hildreth
Cary & Jenney
Attys

June 7, 1938.   C. B. DE VLIEG   2,119,705
BACKLASH ELIMINATOR MECHANISM
Filed Jan. 7, 1937   2 Sheets-Sheet 2
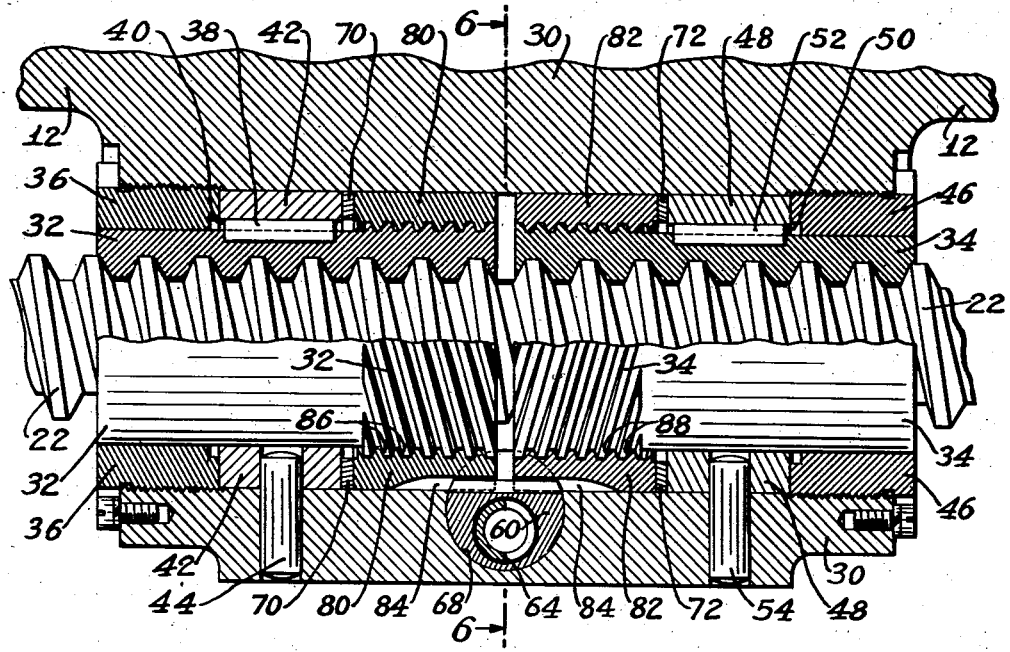
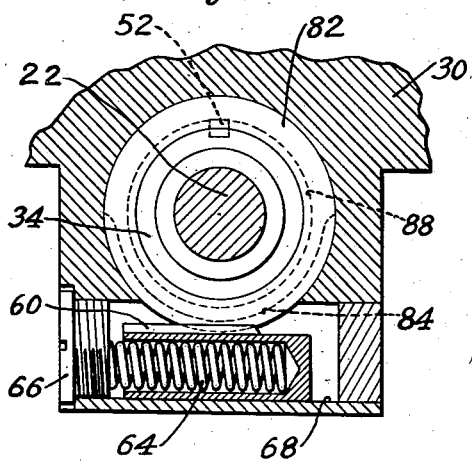
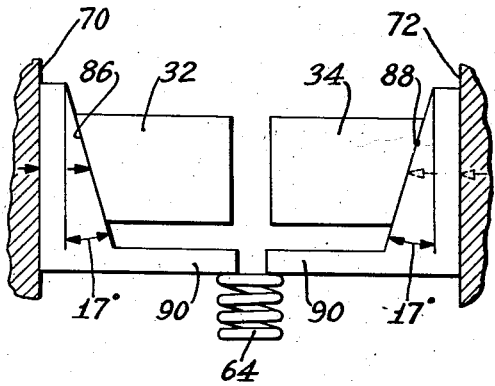
Witness
Charles J. Olson
Inventor.
Charles B. DeVlieg
by Fish Hildreth
Cary & Jenney Attys.

Patented June 7, 1938

2,119,705

UNITED STATES PATENT OFFICE 2,119,705

BACKLASH ELIMINATOR MECHANISM

Charles B. De Vlieg, Detroit, Mich., assignor to Associated Patents, Inc., a corporation of Ohio Application January 7, 1937, Serial No. 119,386

10 Claims. (Cl. 90—22)

The present invention relates to improvements in mechanism for eliminating backlash between relatively movable screw and nut elements of a driving connection for a machine tool support, and is herein disclosed as embodied in a milling machine having cooperating screw and nut driving connections for a transversely movable work supporting table.

It is a principal object of the invention to provide an improved mechanism for eliminating backlash between the screw and nut elements of a driving connection of this general description, which will operate to secure a sensitive and accurate take-up action to maintain at all times a tight operating engagement between the screw and nut elements without materially increasing the frictional load in the connection, and will at the same time provide a positive drive through said connection in either direction with relation to a force such as that supplied, for instance, by a milling cutter acting either in the same or an opposite direction to that of support movement.

It is a further object of the invention to provide an improved take-up mechanism for eliminating backlash between the screw and nut elements of the driving connection, which will operate to reduce to a minimum any error in the position of the driven support which might be introduced by the operation of the take-up mechanism to eliminate backlash due to variations in the pitch or spacing of the screw thread.

Figure 1:
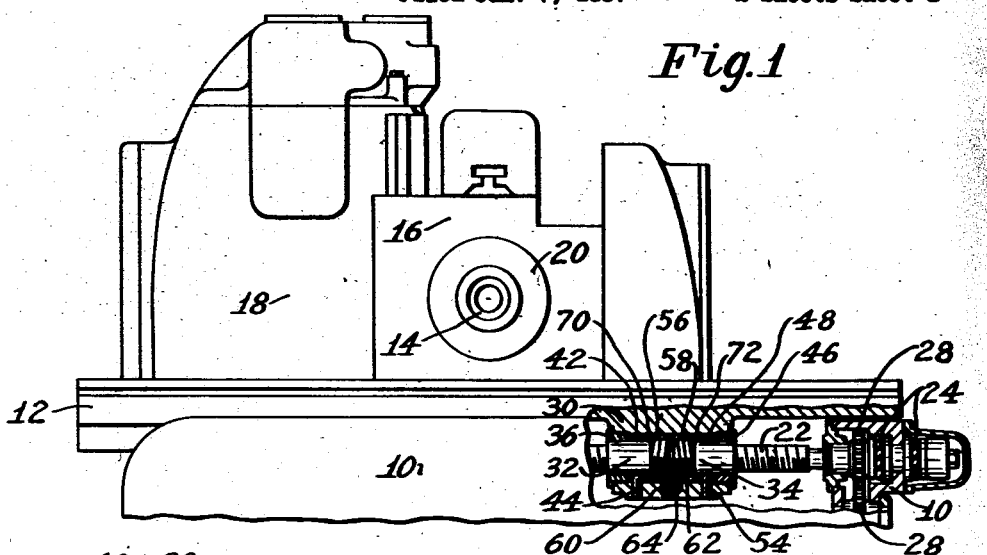
Figure 2:
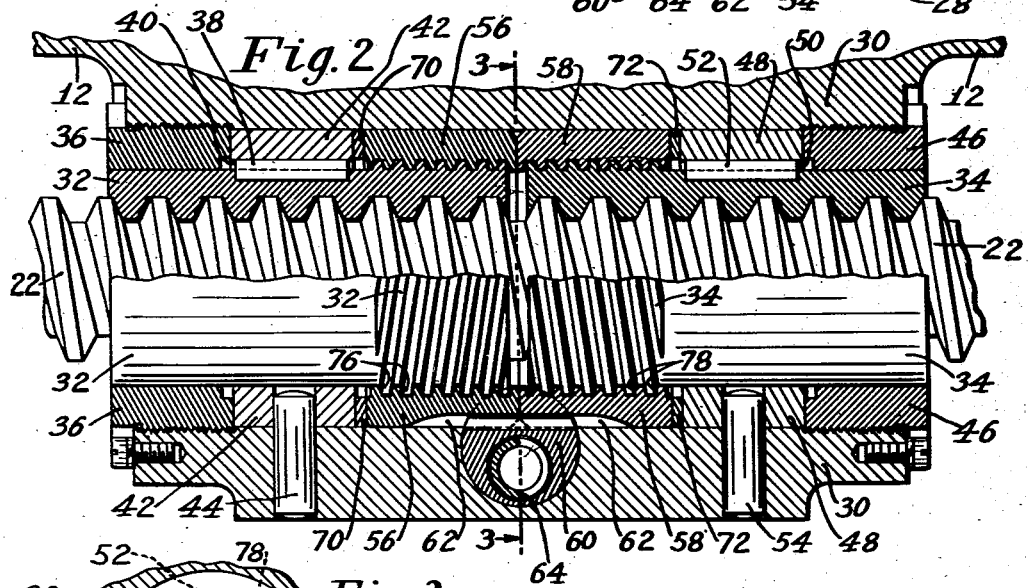
Figure 3:
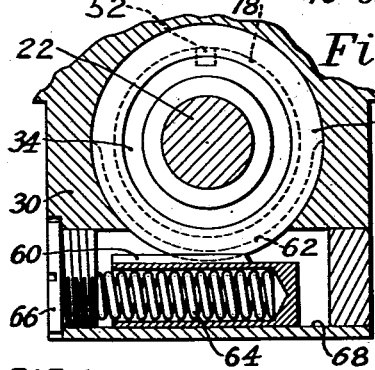
Figure 4:
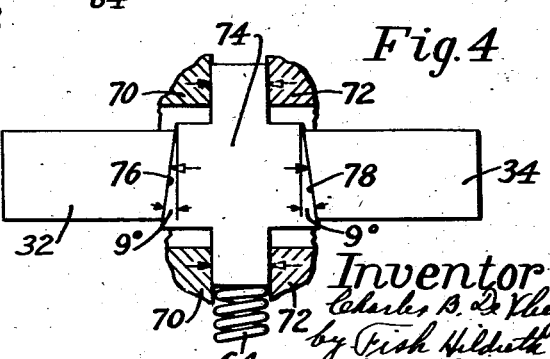

With these and other objects in view, as may hereinafter appear, the several features of the invention consist also in the devices, combinations and arrangements of parts hereinafter described and claimed, which together with the advantages to be obtained thereby, will be readily understood by one skilled in the art from the following description taken in connection with the accompanying drawings, in which Fig. 1 is a view in front elevation of a conventional type of milling machine with a portion of the base broken away, and with certain of the parts shown in section to illustrate the connection of applicant's improved driving connection with the machine; Fig. 2 is an enlarged detail view partly in section, illustrating specifically the mechanism for taking up backlash between the screw and nut elements of the table drive; Fig. 3 is a sectional view taken on the line 3—3 of Fig. 2; Fig. 4 is a diagrammatic view illustrating the mode of operation of applicant's driving connection and the disposition of the several forces acting thereon during operation of the machine; Fig. 5 is an enlarged detail view partly in section, illustrating a modified form of applicant's mechanism for taking up backlash between the screw and nut elements of the table drive; Fig. 6 is a sectional view taken on the line 6—6 of Fig. 5; and Fig. 7 is a diagrammatic view illustrating the mode of operation of applicant's modified driving connection shown in Fig. 5, and the disposition of the several forces acting thereon during the operation of the machine.

While a number of mechanisms for eliminating backlash between the screw and nut elements of a driving connection have been developed as, for example, that disclosed in applicant's prior Patent No. 2,059,091, dated October 27, 1936, difficulty has been encountered in providing a take-up device which will adapt itself readily to variations in pitch or spacing of the screw threads without unduly increasing the frictional resistance in the driving connection, and will at the same time permit the screw and nut elements to perform their primary function which is to provide an absolutely positive and irreversible drive through the connection for all operating conditions during table travel in either direction.

In carrying out the present invention, applicant has provided a take-up device comprising essentially a spring-actuated take-up unit which is rigidly supported against axial movement on the driven support, and is provided with oppositely cammed surfaces for imparting equal and opposite movements to a pair of nuts threaded to the screw and keyed against relative angular movement thereon. The take-up unit including the cam surfaces referred to, operates directly to control the axial positions of both nuts with relation to the driven support, so that forces acting on the table in either direction axially of the screw are transmitted from the table backwardly through the take-up unit to the nuts, and thence to the screw driving element of the connection. With this construction and mode of operation of the take-up device, any adjustment in the take-up mechanism brought about by displacement of either one of the nuts on the feed screw, causes the take-up unit and driven support controlled thereby, to move with relation to the feed screw a distance which is equal to only one-half of the displacement of the nut. The amount of error thus introduced in the position of the table is reduced to a minimum, and will be averaged by a compensating displacement of the other nut during the continuance of the table feed.

The drawings illustrate two separate embodiments of applicant's invention, each having the essential structural features above set forth, but differing in details of construction and having a somewhat different mode of operation to attain the results sought for. In the preferred form of applicant's take-up device illustrated particularly in Figs. 1 to 4 of the drawings, the spring-actuated take-up unit is rendered operative to control the axial positions of the nuts, by means of cam surfaces, each of which is disposed at a frictional locking angle with relation to a force such as that provided by a milling cutter acting on the table in a direction axially of the screw so that an absolutely positive and irreversible driving action is imparted to the table through the screw and nut connection. In order to provide a yielding take-up action, the cam surfaces are constructed to have an angle of intersection of greater than a locking angle, and are arranged to form in effect the opposite sides of a wedge cooperating with the spring take-up means which is operative to permit the take-up device to yield against the equal and opposite thrust of the nuts produced by the spring action of the take-up unit.

Referring specifically to the drawings, the invention is disclosed as applied to a milling machine of ordinary description having a suitable bed or frame designated generally by 10, a work supporting table 12 mounted on suitable ways on the bed for reciprocation thereon, and a horizontal cutter spindle 14 suitably mounted in operating relation to the table. As best shown in Fig. 1, the spindle is journalled in a head 16 which is mounted for vertical adjustment on an upright column 18. Suitable mechanism (not shown) is provided for driving the spindle in either direction. A milling cutter which may be of any ordinary description, is diagrammatically shown at 20.

The table is reciprocated by means of screw and nut feed elements which may be arranged in any one of various ways. As shown in the drawings, a feed screw 22 is journalled on the bed or frame structure 10 with suitable end thrust bearings 24 to prevent endwise displacement of the screw with respect to the bed structure. The nut element of the driving connection is secured to move with the operating table 12 as hereinafter more fully set forth. The feed screw may be rotated manually or by power, it being well known in this art to provide feed mechanism for propelling the table at feed or rapid traverse speeds automatically or otherwise for various cycles of operation. In this instance, the screw is rotated by gears 28 from a source of power (not shown).

In the preferred form of the invention shown in Figs. 1 to 4 inclusive, a nut housing 30, which provides support for two nut elements 32 and 34 threaded to the feed screw 22, is rigidly secured to the under side of the work table 12. The nut 32 is slidably supported in a bushing 36 screw-threaded into the housing 30 and is maintained in a constant angular position by means of a spline 38 secured to the nut 32 and arranged for sliding engagement in a key-way 40 in a ring or band 42 which forms a continuation of the bushing supporting the nut 32. A pin 44 fitted into a hole drilled through the casing 30 and band 42 serves to maintain the band and nut 32 controlled thereby in the desired angular position. The nut 34 is similarly supported within the housing 30 by means of a bushing 46 and band 48 having a key-way 50 adapted to receive a spline 52 secured to the nut 34. The band 48 and nut 34 controlled thereby are maintained in the desired angular position by means of a pin 54 which is driven into a hole drilled through the casing 30 and band 48.

The axial positions of the two nuts 32 and 34 are controlled with relation to the work table 12 and nut housing 30 by means of a take-up unit which comprises a take-up nut 56 having a left-hand screw-threaded engagement with the nut 32, and a take-up nut 58 having a right-hand screw-threaded engagement with the nut 34. The take-up nuts 56 and 58 are supported to move as a single unit by means of a transversely extending rack 60 journalled in the bottom portion of the housing 30, and arranged for engagement with gear teeth 62 formed on adjoining peripheral portions of the take-up nuts 56 and 58. A coil spring 64 inserted between the rear end of the rack 60 and a plug 66 screw-threaded into a bore 68 acts to rotate the take-up nuts 56 and 58 in a direction tending to separate the nuts 32 and 34. With this construction and arrangement of the take-up unit, the take-up nuts 56 and 58 are maintained by the action of the spring 64 and rack 60 at all times in engaging contact with one another. The take-up nuts 56 and 58 are supported against axial movement to the left with relation to the work table 12 and nut housing 30 by means of an end thrust bearing 70 mounted between the take-up nut 56 and the collar 42. An end thrust bearing 72 inserted between the take-up nut 58 and collar 48 similarly operates to prevent axial movement of the take-up nuts to the right with relation to the table 12. The end thrust bearings 70 and 72 are constructed and arranged to provide a tight operating fit between the take-up unit and the work table 12. The lead of the screw threads of the take-up nuts 56 and 58 is specifically designed to provide a frictional locking angle between each of the take-up nuts 56 and 58 and the nuts 32 and 34 controlled thereby, and to provide an angle of intersection between the screw threads which is greater than a locking angle. For purposes of illustration, the lead angle of the screw thread of each of the take-up nuts may be assumed as approximately 9° and the angle of intersection as 18°.

The operation of applicant's take-up device as thus far described, will be best understood in connection with the diagrammatic Fig. 4 of the drawings, in which the take-up unit comprising the take-up nuts 56 and 58 is designated at 74. The screw thread of the take-up nut 56 is designated by the cam surface 76, and the screw thread of the take-up nut 58 is designated by the cam surface 78. The remaining elements of the diagram have been given the same numbers as the machine parts which they represent. As shown in Figs. 2 and 4, endwise movement is transmitted from the screw 22 and nuts 32 and 34 to the take-up unit 74 comprising specifically the take-up nuts 56 and 58, and thence through end thrust bearings 70 and 72 to the table 12. Assuming that a force provided, for example, by the operation of a milling cutter, is operating irrespective of the actual direction of movement of the table to force the table to the left, it will readily be seen that this force will be transmitted backwardly through end thrust bearing 72, take-up unit 74, and cam surface 76 representing the screw-threaded engagement of take-up nut 56 with nut 32, and thence to the driving screw 22. Similarly, a force which may be acting to move the table to the right, irrespective of the actual direction of drive, will be transmitted through end thrust bearing 70, take-up unit 74 and cam surface 76 representing the screw-threaded engagement of the take-up nut 58 with the nut 34 and thence to the feed screw 22. As shown in Fig. 4, the direction of movement of the take-up unit 74 lies in a plane normal to the axis of the feed screw 22. Under each of the conditions above described, the take-up unit 74 is supported on one side against a plain surface represented by one of the end thrust bearings 70 and 72, and on the other side against the corresponding cam surface 78 or 76 having a locking angle, so that an absolutely positive and irreversible driving connection is established between the feed screw 22 and the driven work table 12 for all possible operating conditions of the machine.

The operation of the take-up unit to provide at all times a tight operating engagement between the nut and screw elements of the driving connection, may be described as follows:—The spring 64 tends to move the take-up unit 74 comprising take-up nuts 56 and 58 in a direction so that the cammed surfaces 76 and 78 representing the screw-threaded engagement of the take-up nuts 56 and 58 with the nuts 32 and 34, will move the nuts away from each other equal distances in opposite directions with relation to the transverse plane of movement of the take-up unit 74 on the work table 12. Any variations in the pitch or thickness of the screw threads tending to move the nuts 32 and 34 toward each other, will cause these nuts to exert an equal and opposite pressure on the take-up unit 74 acting through the cam surfaces 76 and 78 respectively. Since as the angle of intersection of these surfaces is greater than a locking angle, the pressure thus exerted by the nuts 32 and 34 can operate to move the take-up unit 74 against the pressure of the spring 64 to permit an automatic adjustment of the nuts 32 and 34 with relation to the feed screw 22. It will readily be seen that with this construction, a sensitive take-up action is provided between the screw and nut elements of the driving connection, which serves at all times to maintain a tight operating engagement of the screw and nut elements in the connection, and is yieldable to prevent the building up of excessive friction which materially increase the frictional load in the connection.

Inasmuch as the take-up unit 74 is maintained at all times in a fixed driving relation to the table 12 between the end thrust bearings 70 and 72, and any adjustment of the take-up mechanism must necessarily cause the nuts 32 and 34 to move equal distances toward or away from the take-up unit 74, the displacement of either one of the nuts 32 or 34 with relation to the feed screw must cause the take-up unit and table 12 controlled thereby to move with relation to the feed screw 22 a distance which is equal to only one-half of the amount of the displacement of the nut. A take-up mechanism constructed and arranged as above described operates, therefore, to average, and thereby to reduce to a minimum the error introduced in the position of the table 12 and work supported thereon by the operation of the take-up mechanism, to compensate for any irregularities which may exist in the feed screw 22.

An alternative form of applicant's device for eliminating backlash between the screw and nut elements of the driving connection is illustrated in Figs. 5, 6 and 7 of the drawings. As in the construction above described, two nuts 32 and 34 are mounted on the feed screw 22, and are slidably mounted within the casing 30. The nut 32 is held in a constant angular position by means of the spline 38, and the nut 34 is similarly supported against angular movement by the spline 52. The take-up unit in this instance, comprises the two take-up nuts 80 and 82 which are supported respectively against the end thrust bearings 70 and 72 in the housing 30, and are rotated as a single unit by means of spring 64 and rack 60 engaging with gear teeth 84 formed on adjoining portions of the peripheral surface of the take-up nuts 80 and 82. In the modified construction, the take-up nut 80 has a right-hand screw-threaded engagement with the nut 32, and the take-up nut 82 has a left-hand screw-threaded engagement with the nut 34, so that the take-up unit operates to move the nuts 32 and 34 yieldingly toward each other, instead of away from each other as in the first embodiment described. With the construction shown, each of the screw threads designated respectively at 86 and 88 formed on the take-up nuts 80 and 82, have a lead greater than a locking angle. For purposes of illustration, this lead may be assumed to be in the vicinity of 17°.

The operation of applicant's modified construction wil be readily understood from the diagrammatic Fig. 7, in which the take-up unit comprising the two take-up nuts 80 and 82 is represented by the numeral 90. The screw threads 86 and 88 are represented as cam surfaces, and the end thrust bearings 70 and 72 are represented as fixedly spaced plain surfaces to illustrate in a convenient form the relative distribution of forces in the connection.

As in the first embodiment described, the driving impulse is imparted to the table from the screw 22 through the take-up unit comprising take-up nuts 80 and 82 which are controlled by the rack 60 to operate as a unit, and are supported in a stationary relationship to the table 12 against end thrust bearings 70 and 72. Assuming that a force is operating irrespective of the actual direction of movement of the table to force the table to the left, this force is transmitted backwardly through end thrust bearings 72, take-up nut 82 and cam surface 88 representing the screw-threaded engagement of take-up nut 82 with nut 34, and thence to the feed screw 22. Similarly, a force which may be acting to move the table to the right irrespective of the actual direction of drive, will be transmitted through end thrust bearing 70, take-up nut 80 and cam surface 86 representing the screw-threaded engagement of the take-up nut 80 with the nut 32, and thence to the feed screw 22. Inasmuch as each of the screw threads 86 and 88 is disposed at slightly greater than a locking angle, it will be understood that with this embodiment of the invention, a sufficiently heavy spring 64 must be employed to prevent slippage under ordinary operating conditions.

The operation of the modified take-up unit comprising the take-up nuts 80 and 82 to provide at all times a tight operating engagement between the nut and screw elements of the driving connection, is similar to the first construction described, in that relative axial movement of the nuts 32 and 34 is controlled by the take-up unit in such a manner as to cause this movement to take place in equal and opposite directions with reference to a fixed point on the table 12 as determined by the axially stationary position of the take-up nuts 80 and 82. It will readily be seen by reference to Fig. 5 and the explanatory diagram Fig. 7, that variations in the pitch or spacing of the threads of the feed screw tending to move the nuts 32 and 34 relatively away from each other, exert an equal and oppositely directed pressure on the take-up unit 90, as indicated in Fig. 7, to move the take-up unit against the pressure of its spring 64.

Applicant's modified construction has, therefore, the advantage described in connection with the first device shown, in that adjustment of the take-up device brought about by the displacement of either one of the nuts 32 or 34 with relation to the feed screw, causes the take-up unit and table 12 controlled thereby to move with relation to the feed screw 22, a distance which is equal to only one-half of the displacement of the nut. Any error introduced in the position of the table 12 axially of the feed screw by the operation of the take-up mechanism, is thereby reduced to a minimum, and will be averaged by compensating movement of the other nut during continued relative movement of the screw and nut elements of the driving connection to feed the table.

Referring again to the modified construction shown in Figs. 5 to 7 of the drawings, and more particularly to the diagrammatic Fig. 7, will be evident that the pressure exerted by the nut 34 acts through the cam surface 88 against the plain surface representing the end thrust bearing 72, and that the nut 32 similarly acts through the cam surface 86 against the plain surface representing the end thrust bearing 70. The screw threads 86 and 88 must, therefore, be disposed at a frictional non-locking angle with relation to forces acting axially of the screw to permit the ease-off of the take-up device against the pressure of the spring 64. This construction and arrangement of the take-up unit has the particular advantage that the take-up action of the spring 64 serves also to maintain the take-up nuts 80 and 82 tightly in engagement with their respective end thrust bearings 70 and 72, thus obviating any difficulties which might be encountered with the first construction illustrated in securing and maintaining a tight operating fit between the take-up unit and the end thrust bearings through which the drive is transmitted to the table 12.

It will be understood that the invention is not limited to the specific embodiment shown, and that various deviations may be made therefrom without departing from the spirit and scope of the appended claims.

What is claimed is:—

1. A mechanism to eliminate backlash between the relatively movable screw and nut elements of a driving connection which comprises a support and a second support relatively movable thereto, a feed screw on one of said supports, a pair of nuts, means for maintaining a constant angular relationship between the nuts, a take-up unit on the other of said supports movable in a plane normal to the axis of the screw and having oppositely inclined cam surfaces acting respectively against said nuts to impart equal and opposite movements to the nuts, tensioning means for imparting a take-up tensioning strain to said take-up unit, and positioning means comprising oppositely disposed end thrust surfaces acting directly against said take-up unit to rigidly position said unit against movement with relation to its support axially of the screw in either direction.

2. A mechanism to eliminate backlash between the relatively movable screw and nut elements of a driving connection which comprises a support and a second support relatively movable thereto, a feed screw on one of said supports, a pair of nuts, means for maintaining a constant angular relationship between said nuts, a take-up nut unit comprising a portion having left-hand screw-threaded engagement with one of said nuts, and a portion having right-hand screw-threaded engagement with the other of said nuts, spring means acting on said take-up nut unit to impart simultaneous relative movement to said nuts in opposite directions, and end thrust bearings acting in opposite directions directly against said portions of the take-up unit to support said unit on the other of said supports against movement axially of the screw in either direction.

3. A mechanism to eliminate backlash between relatively movable screw and nut elements of a driving connection which comprises a support and a second support relatively movable thereto, a feed screw movable with one of said supports, a pair of nuts, means for maintaining a constant angular relationship between said nuts, a take-up nut unit comprising a take-up nut having a left screw-threaded engagement with one of said nuts, a take-up nut having a right screw-threaded engagement with the other of said nuts, a rack engaging with cooperating teeth formed on the peripheries of said take-up nuts to move said take-up nuts as a unit, spring means acting on the rack and take-up nuts to impart a simultaneous relative axial take-up action to said nuts, and end thrust bearings for supporting said take-up nuts on the other of said supports against axial movement with the screw in either direction.

4. A mechanism to eliminate backlash between the relatively movable screw and nut elements of a driving connection which comprises a support and a second support relatively movable thereto, a feed screw movable with one of said supports, a pair of nuts, means for maintaining a constant angular relationship between said nuts, a take-up nut unit comprising a portion having left-hand screw-threaded engagement with one of said nuts, and a portion having right-hand screw-threaded engagement with the other of said nuts, spring means to rotate the take-up unit in a direction to impart equal and opposite spreading movements to the nuts, and end thrust bearings having a tight operating fit to support the take-up nut unit on the other of said supports against axial movement in either direction with the screw.

5. A mechanism to eliminate backlash between the relatively movable screw and nut elements of a driving connection for a machine tool support which comprises a support and a second support relatively movable thereto, a feed screw supported on one of said supports, a pair of nuts threaded thereto, means for maintaining a constant angular relationship between the nuts, a take-up unit movable on the other of said supports in a plane normal to the axis of the screw and having oppositely inclined cam surfaces acting to impart equal and opposite spreading movements to the nuts, each of said surfaces having a slope disposed at a frictional locking angle from said transverse plane with relation to forces acting axially of the screw, and an angle of intersection of greater than a frictional locking angle, spring means for actuating said take-up unit to axially separate the nuts, and supporting means for the take-up unit comprising end thrust bearing surfaces arranged to provide a tight operating fit for said take-up unit on the other of said supports against axial movement in either direction with the screw.

6. A mechanism to eliminate backlash between relatively movable screw and nut elements of a driving connection which comprises a support and a second support relatively movable thereto, a feed screw supported on one of said supports, a pair of nuts, means for maintaining a constant angular relationship between said nuts, a take-up nut unit comprising a portion having left-hand screw-threaded engagement with one of said nuts, and a portion having right-hand screw-threaded engagement with the other of said nuts, said screw-threaded portions each having a lead to provide a frictional locking angle against forces acting axially of the screw and an angle of intersection of greater than a locking angle, spring means acting to rotate the take-up nut unit in a direction to impart a simultaneous spreading take-up action to the nuts, and end thrust bearings having a tight operating fit to support the take-up nut unit on the other of said supports against axial movement in either direction with the screw.

7. A mechanism to eliminate backlash between the relatively movable screw and nut elements of a driving connection for a machine tool support which comprises a feed screw, a pair of nuts threaded thereto, means for maintaining a constant angular relationship between the nuts, a take-up unit comprising two rotatable take-up members having oppositely cammed surfaces acting respectively against said nuts and adapted to impart equal and opposite movements to the nuts toward each other, means for connecting said take-up members to rotate as a unit, tensioning means acting on said take-up unit for imparting a take-up tensioning strain to the nuts, and supporting means for said take-up members comprising end thrust bearings between which said take-up members are interposed.

8. A mechanism to eliminate backlash between the relatively movable screw and nut elements of a driving connection for a machine tool support which comprises a feed screw, a pair of nuts threaded thereto, means for maintaining a constant angular relationship between the nuts, a take-up unit comprising a take-up member having a left-hand screw-threaded engagement with one of said nuts, and a take-up member having a right-hand screw-threaded engagement with the other of said nuts, means for connecting said take-up members to rotate as a unit to impart equal and opposite movements to the nuts toward each other, spring means acting on said take-up unit to impart a take-up tensioning strain to the nuts, and supporting means for said take-up members comprising end thrust bearings between which said take-up members are interposed.

9. A mechanism to eliminate backlash between the relatively movable screw and nut elements of a driving connection for a machine tool support which comprises a feed screw, a pair of nuts threaded thereto, means for maintaining a constant angular relationship between the nuts, a take-up unit comprising a take-up member having a left-hand screw-threaded engagement with one of said nuts, and a take-up member having a right-hand screw-threaded engagement with the other of said nuts, a rack operatively connected to rotate both of said nuts as a unit, spring means acting on said rack to impart a take-up tensioning strain to said nuts axially in opposite directions toward each other, and supporting means for the take-up unit comprising end thrust bearings between which said take-up members are imposed.

10. A mechanism to eliminate backlash between the relatively movable screw and nut elements of a driving connection for a machine tool support which comprises a feed screw, a pair of nuts threaded thereto, means for maintaining a constant angular relationship between the nuts, a take-up unit comprising two rotatable take-up members having oppositely cammed surfaces acting respectively against said nuts and each disposed at a non-locking frictional angle with relation to forces acting axially of the screw to impart equal and opposite movements to the take-up nuts toward each other, means for connecting said take-up nuts to rotate as a unit, spring means for imparting a take-up tension to said take-up unit, and supporting means for said take-up unit comprising end thrust bearing surfaces between which said take-up members are interposed.

CHARLES B. DE VLIEG.